United States Patent [19]

Ojakaar et al.

[11] Patent Number: 5,268,405
[45] Date of Patent: Dec. 7, 1993

[54] LOW TEMPERATURE PERFLUOROELASTOMERS

[75] Inventors: Leo Ojakaar, Hockessin; Russell W. Schnell; Kenneth A. Senior, both of Wilmington, all of Del.

[73] Assignee: E. I. Du Pont de Nemours and Company, Wilmington, Del.

[21] Appl. No.: 40,813

[22] Filed: Mar. 31, 1993

[51] Int. Cl.$^5$ .................................................. C08K 5/06
[52] U.S. Cl. ..................................... 524/366; 526/247
[58] Field of Search .......................... 524/366; 526/247

[56] References Cited

U.S. PATENT DOCUMENTS

| | | | |
|---|---|---|---|
| 3,467,638 | 9/1969 | Pattison | 526/91 |
| 3,682,872 | 8/1972 | Brizzolara et al. | |
| 3,740,369 | 6/1973 | Proskow | 524/366 |
| 3,810,874 | 5/1974 | Mitsch et al. | 528/44 |
| 4,281,092 | 7/1981 | Breazeale | |
| 4,321,404 | 3/1982 | Williams et al. | 560/115 |
| 4,413,094 | 11/1983 | Aufdermarsh, Jr. | |
| 4,487,903 | 12/1984 | Tatemoto et al. | |
| 4,983,697 | 1/1991 | Logothetis | |
| 5,143,963 | 9/1992 | Sterling et al. | 524/366 |

FOREIGN PATENT DOCUMENTS 0098698  1/1984  European Pat. Off. ............ 526/247

*Primary Examiner*—Joseph L. Schofer
*Assistant Examiner*—N. Sarofin

[57] ABSTRACT

Perfluoroelastomer compositions containing high molecular weight perfluoropolyether exhibit improved low temperature properties.

5 Claims, No Drawings

LOW TEMPERATURE PERFLUOROELASTOMERS

FIELD OF THE INVENTION

This invention pertains to perfluoroelastomers, and in particular to the enhancement of the low temperature properties of such elastomers.

BACKGROUND OF THE INVENTION

Perfluoroelastomers, such as those described in U.S. Pat. Nos. 3,682,872, 4,281,092, 4,487,903 and 4,983,697, have properties that make them attractive for use under unusually severe conditions. These materials are suitable for applications requiring the characteristics of an elastomer and, at the same time, tolerance for exposure to high temperatures or to aggressive chemicals.

The mechanical properties of perfluoroelastomers, in common with other elastomers, are conventionally adjusted by varying the ratios of perfluoromonomers in the polymers, by varying the amount of carbon black and other compound ingredients, and by varying the curing or vulcanizing chemistry. Certain uses, however, require combinations of properties not attainable by known means. One particularly desirable improvement would be a reduction in glass transition temperature ($T_g$) with the accompanying extension of service temperature range to lower temperatures.

SUMMARY OF THE INVENTION

This invention provides cured perfluoroelastomers which exhibit enhanced low temperature properties through the incorporation into the compound of a selected perfluoropolyether, without sacrifice of heat aging and chemical exposure characteristics.

Specifically, the present invention provides, in a perfluoroelastomer composition comprising copolymerized units of perfluoroolefin, perfluoro(alkyl vinyl) ether wherein the alkyl group contains 1-5 carbon atoms, and up to three mole percent of at least one curesite moiety, the improvement wherein the composition further comprises about from 5 to 20 phr of a perfluoropolyether having a viscosity of at least about 3000 mm$^2$/s.

DETAILED DESCRIPTION OF THE INVENTION

The present invention is based on the discovery that the low temperature properties of cured perfluoroelastomers can be enhanced through the blending of a perfluoropolyether (PFPE) into the perfluoroelastomer compound. Surprisingly, $T_g$ is significantly reduced by the selection of PFPE with appropriate viscosity. When such compounds are used to fabricate seals, sealing capabilities at low temperature are enhanced. These improvements are achieved without sacrifice of high temperature stability and chemical resistance.

Perfluoroelastomers of this invention are prepared primarily from two or more perfluorinated monomers such as tetrafluoroethylene (TFE) or other perfluoroolefins, and perfluoro (alkyl vinyl) ethers wherein the alkyl group contains 1 to 5 carbon atoms. Typical of such reactants are perfluoro (methyl vinyl) ether (PMVE) and perfluoro (propyl vinyl) ether (PPVE). These monomers are typically used in conjunction with a comonomer which facilitates crosslinking. Small concentrations of monomers which are not perfluorinated can also be used. Normally, such monomers are employed to obtain desirable crosslinking characteristics and may be present in concentrations up to about 3 mol %. Examples of such monomers include bromotetrafluorobutene, bromotrifluoroethylene, and monomers containing cyano groups. Alternatively or additionally, chain transfer agents which are not perfluorinated can be used in the polymerization reaction to introduce desirable fragments into the polymer for curing purposes. Such agents include di-iodo compounds that result in bound iodine in the polymer, commonly at the end of the molecule. Representative perfluoroelastomers are illustrated by U.S. Pat. Nos. 3,467,638, 4,281,092, 4,487,903, 4,529,784, 4,948,853, 4,983,697.

The PFPE used in this invention can have any chain structure in which oxygen atoms in the backbone of the molecule are separated by saturated fluorocarbon groups. More than one type of fluorocarbon group can be present in the molecule.

Representative structures for PFPE which can be used in the present invention include:

  (I)

  (II)

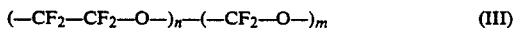  (III)

  (IV)

These structures are discussed by Franco Piacenti in Chemistry International, 13, p147 (1991). As indicated in this article, the PFPE has perfluorinated end groups. The PFPE used in this invention should have kinematic viscosity of at least about 3000 mm$^2$/s, and preferably in the range 3000–4000 mm$^2$/s, as measured at 20° C. by ASTM-D-445.

Specific PFPEs which can be used in the present invention are available commercially as general purpose lubricants based on a series of fluorine-end-capped homopolymers of hexafluoropropylene epoxide with the following chemical structure:

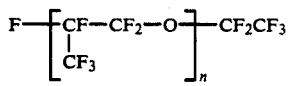

For the viscosity required in the present invention, these compounds should have a sufficient number of repeat units to provide the required viscosity.

The PFPE is incorporated into the fluoroelastomer composition by conventional compounding techniques, in amounts of about from 5 to 20 parts of PFPE per hundred parts of the perfluoropolymer. Less than about 5 parts of the PFPE does not provide a significant improvement in the perfluoroelastomer. Concentrations of the PFPE greater than about 20 phr provide no further improvement and can exude from the composition.

The compositions of the present invention can be used for a wide variety of applications in which both low temperature performance and the usual outstanding characteristics of perfluoroelastomers are required. Particular uses include sealing and packing applications in which extremely low temperatures will be experienced. For example, valve packings prepared from the present blends can function satisfactorily at temperatures of about −50° C.

PFPE oils have previously been used to plasticize perfluoroelastomer compositions. However, previously used oils of this type were volatile and fugitive, and accordingly exuded when incorporated at levels sufficiently high for plasticization. Previous attempts to solve the problem of exuding has included incorporation of a curesite monomer which co-cured with the perfluoroelastomer. The present invention, with the specification of a high viscosity PFPE, provides a combination of processing and performance characteristics that has previously not been available.

In the following Examples and Control Examples, compounds of perfluoroelastomer and perfluoropolyether with other ingredients specified were prepared on a standard two-roll rubber mill with the rolls heated to about 55° C. In the mill mixing process, the perfluoroelastomer polymer is first introduced to the roll nip alone and is milled until a band is formed, the polymer is well blended, and a rolling bank is maintained on the mill. Additives, including perfluoropolyether, which were previously weighed out, were then added to the nip and the resulting composition was milled until uniform.

Two PFPE compositions used in the examples and the control examples are identified and characterized as follows:

PFPE X is a perfluoropolyether of Type I as discussed above, having viscosity of about 1600 mm²/s at 20° C., commercially available as KRY-TOX ® fluorinated oil grade 143AD (DuPont Company) and representative of PFPE oils used in perfluoroelastomer compounds prior to this invention.

PFPE Y is also a perfluoropolyether of Type I as discussed above, having viscosity of about 3500 mm²/s at 20° C., commercially available as KRY-TOX ® fluorinated oil grade 16350 (DuPont Company).

The compounded blends were converted to a form suitable for most of the physical testing by compression molding into sheets 15 cm square and 1.9 mm thick. Curing and post-curing followed procedures outlined in the various examples. Specimens for physical testing were die-cut from the sheet as called for by the test methods summarized in Table I. Differential scanning calorimetry (DSC) was used for measurement of $T_g$.

TABLE I

| Physical Test Methods | | |
|---|---|---|
| Symbol | Property | Method |
| $M_{100}$ | Modulus at 100% elongation (psi or MPa) | ASTM D-412 |
| $T_b$ | Tensile strength at break (psi or MPa) | ASTM D-412 |
| $E_b$ | Elongation at break (%) | ASTM D-412 |
| H | Hardness (Shore A, pellet) | ASTM D-395 |
| CS | Compression Set (%, 70 hr/204° C., pellet) | ASTM D-395 |
| $T_g$ | Glass transition temperature (°C.) | DSC |

In all Examples and Control examples, parts and percentages are by weight.

EXAMPLES 1-6 AND CONTROL EXAMPLES A-E

Perfluoroelastomer Polymer P was an elastomeric copolymer of TFE and PMVE with 5-pentafluorophenoxy-perfluoro-(5-methyl-3-oxa-1-pentene) as a curesite monomer. It was prepared generally as described in U.S. Pat. No. 3,467,638. Polymer P was compounded with PFPE and other ingredients as listed in Table II, molded, and tested according to the procedures described above. The molded sheet was press-cured at 190° C. for 30 minutes, then post-cured in a nitrogen atmosphere in an oven by first increasing temperature slowly from room temperature to 260° C. over a 40-hr period followed by post-curing for 8 hr at 260° C. The test results in Table II show that PFPE X and PFPE Y have similar effects on the mechanical properties of the compositions, but that PFPE Y has a surprisingly greater effect on $T_g$ for PFPE concentrations greater than 3 phr. In Table II, the results for Example 6 are the average of measurements for two compound preparations. Results for the other examples and the controls are based on a single compounding.

TABLE II

| | Example | | | | | | | | | | |
|---|---|---|---|---|---|---|---|---|---|---|---|
| | A | B | C | D | E | 1 | 2 | 3 | 4 | 5 | 6 |
| Formulation: | | | | | | | | | | | |
| Polymer P | 100 | 100 | 100 | 100 | 100 | 100 | 100 | 100 | 100 | 100 | 100 |
| PFPE X | — | 3 | 7 | 10 | 20 | — | — | — | — | — | — |
| PFPE Y | — | — | — | — | — | 3 | 5 | 7 | 10 | 15 | 20 |
| Carbon Black[a] | 10 | 10 | 10 | 10 | 10 | 10 | 10 | 10 | 10 | 10 | 10 |
| DCH-18-Crown-6[b] | 4 | 4 | 4 | 4 | 4 | 4 | 4 | 4 | 4 | 4 | 4 |
| MgO | 4 | 4 | 4 | 4 | 4 | 4 | 4 | 4 | 4 | 4 | 4 |
| $K_2AF$[c] | 3 | 3 | 3 | 3 | 3 | 3 | 3 | 3 | 3 | 3 | 3 |
| Properties: | | | | | | | | | | | |
| $M_{100}$ | 2651 | 2608 | 2399 | 2176 | 1441 | 2637 | 2345 | 2244 | 2098 | 1635 | 1537 |
| $T_b$ | 3277 | 3328 | 3479 | 2553 | 3099 | 3335 | 3938 | 3373 | 3263 | 3383 | 2930 |
| $E_b$ | 121 | 121 | 132 | 138 | 159 | 118 | 149 | 134 | 134 | 160 | 151 |
| H | 95 | 92 | 89 | 89 | 83 | 90 | 88 | 89 | 88 | 86 | 86 |
| CS | 28 | 27 | 26 | 26 | 24 | 24 | 26 | 25 | 24 | 25 | 25 |
| $T_g$ | −5 | −7 | −7 | −21 | −48 | −7 | −12 | −20 | −33 | −45 | −52 |

[a]SAF type carbon black
[b]PCR, Inc.
[c]Dipotassium salt of bisphenol-AF

EXAMPLE 7 AND CONTROL EXAMPLES F AND G

Perfluoroelastomer Polymer R was compounded with PFPE and other ingredients as listed in Table III, molded, and tested according to the procedures described above. Polymer R was a TFE/PMVE/8-CNVE perfluoroelastomer prepared generally as described in U.S. Pat. No. 4,281,092. The curesite monomer, 8-CNVE, is perfluoro-(8-cyano-5-methyl-3,6-dioxa-1-octene). The molded sheet was press-cured at 200° C. for 30 minutes, and then post-cured in a nitrogen atmosphere oven at 90° C. for 6 hr followed by a uniform transition to 305° C. over 10 hr and in turn followed by 26 hr at 305° C. As shown by the test results in Table III, mechanical properties are a distinct function of the amount of carbon black used. However, the incorporation of PFPE Y in the blend yields significantly lower $T_g$ than obtained for either blend containing PFPE X, even though the blend with PFPE Y has an intermediate carbon loading.

TABLE III

|  | Example |  |  |
|---|---|---|---|
|  | F | G | 7 |
| Formulation: |  |  |  |
| Polymer R | 100 | 100 | 100 |
| PFPE X | 10 | 10 |  |
| PFPE Y |  |  | 10 |
| Carbon Black[a] | 15 | 50 | 25 |
| 18 crown-6[b] | 0.3 | 0.3 | 0.3 |
| Tetraphenyltin | 3 | 3 | 3 |
| Properties: |  |  |  |
| $M_{100}$ |  |  |  |
| MPa | 2.59 | 14.4 | 4.87 |
| psi | (375) | (2088) | (712) |
| Tb |  |  |  |
| MPa | 14.1 | 17.2 | 11.6 |
| psi | (2077) | (2562) | (1687) |
| Eb | 239 | 121 | 198 |
| H | 62 | 91 |  |
| CS | 12 | 29 | 19 |
| $T_g$ | −17 | −20 | −35 |

[a]MT type carbon black
[b]Parish Chemical Co.

EXAMPLE 8 AND CONTROL EXAMPLE H

Perfluoroelastomer Polymer S was compounded with PFPE and other ingredients as listed in Table IV, molded, and tested according to the procedures described above. Polymer S was a copolymer of TFE, PMVE, and BTFB in which BTFB is curesite monomer 4-bromo-3,3,4,4-tetrafluorobutene. Perfluoroelastomers of this type and their preparation are described in U.S. Pat. No. 4,035,565. After milling and molding by the general procedures described above, the sheet was press-cured at 177° C. for 10 minutes, then post-cured in a nitrogen atmosphere oven following the time-temperature schedule of Examples 1-6. The test results in Table IV show that PFPE Y produces a beneficial reduction in $T_g$ for Polymer S type perfluoroelastomers, even at a relatively high loading of carbon black.

TABLE IV

|  | Example |  |
|---|---|---|
|  | H | 8 |
| Formulation: |  |  |
| Polymer S | 100 | 100 |
| PFPE X | 10 |  |
| PFPE Y |  | 10 |
| Carbon Black[a] | 45 | 45 |
| Crosslinking Agent[b] | 3 | 3 |
| TMAIC[c] | 2 | 2 |
| Proton Sponge ®[d] | 0.5 | 0.5 |
| TMS[e] | 0.5 | 0.5 |
| Properties: |  |  |
| $M_{100}$ | 9.5 | 11.1 |
|  | (1379) | (1611) |
| $T_b$ | 13.4 | 13.35 |
|  | (1965) | (1938) |
| $E_b$ | 130 | 124 |
| H | 92 | 88 |
| CS | 34 | 31 |

TABLE IV-continued

|  | Example |  |
|---|---|---|
|  | H | 8 |
| $T_g$ | −12 | −17 |

[a]MT bype carbon black
[b]50% 2,5-dimethyl-2,5-dit(t-butyl-peroxy) hexane on an inert carrier, commercially available from Atochem, Inc. as Luperco ® 101XL.
[c]Trimethallyl isocyanurate, Diak ® No. 8 curing agent, DuPont Co.
[d]1,8-bis-(dimethylamino)-naphthalene, Aldrich Chemical Co.
[e]Tetramethylene sulfone

EXAMPLE 9 AND CONTROL EXAMPLES I AND J

The compounds of Example 4 and Controls A and D were prepared again, molded as described above, and tested as prepared and after heat aging for 70 hr at 260° C. in air. Results are presented in Table V, with the formulations also identified as A', D', and 4' for correlation with the earlier Examples. These results indicate that PFPE has little effect on the thermal stability of the compound, and suggest that the use of the high-viscosity PFPE results in less weight loss. The advantage of PFPE Y with respect to weight loss was shown by the aging of o-rings molded from the same compounds and aged at 260° C. for 70, 168, and 336 hr. Weight changes for the compounds containing PFPE Y were essentially equal to those for Control A' and approximately half those for Control D' containing PFPE X. After 336 hr, the weight changes were −3.2% for Control A', −5.9% for Control D', and −2.9% for Example 4'.

TABLE V

|  | Example |  |  |
|---|---|---|---|
|  | I(A') | J(D') | 9(4') |
| Properties: |  |  |  |
| As molded: |  |  |  |
| $M_{100}$ |  |  |  |
| MPa | 20.5 | 14.9 | 15.4 |
| psi | (2986) | (2167) | (2233) |
| Tb |  |  |  |
| MPa | 24.1 | 25.4 | 23.1 |
| psi | (3499) | (3686) | (3340) |
| $E_b$ | 114 | 153 | 141 |
| After 70 hr at 260° C. |  |  |  |
| $M_{100}$ |  |  |  |
| MPa | 15.7 | −12.3 | 11.8 |
| psi | (2277) | (1778) | (1705) |
| $T_b$ |  |  |  |
| MPa | 23.3 | 24.9 | 23.5 |
| psi | (3355) | (3616) | (3401) |
| $E_b$ | 129 | 160 | 159 |
| $T_g$ | −5 | −21 | −33 |
| Weight change (%) | −1.9 | −2.6 | −1.8 |

CONTROL EXAMPLES K-M

The benefit of high-viscosity PFPE in a hydrogen-containing fluoroelastomer was explored using Polymer T, a VF/HFP/TFE terpolymer prepared generally according to U.S. Pat. No. 4,123,603. Polymer T was compounded with 30 phr of MT carbon black, 3 phr of magnesium oxide, 6 phr of calcium hydroxide, 0.6 phr of benzyl triphenyl phosphonium chloride in 1.2 phr of fluoroelastomer carrier, 1.6 phr of bisphenol AF in 1.6 phr of fluoroelastomer carrier containing a small amount of rice bran wax, and PFPE as listed in Table VI, molded, and tested by the procedures described above. Results also given in Table VI show that neither PFPE has a large effect on $T_g$ and that the benefit of high-viscosity PFPE in perfluoroelastomers is not evident for this hydrogen-containing fluoroelastomer.

TABLE VI

|  | Example |  |  |
|---|---|---|---|
|  | K | L | M |
| Formulation: |  |  |  |
| Polymer T | 100 | 100 | 100 |
| PFPE X |  | 15 |  |
| PFPE Y |  |  | 15 |
| Properties: |  |  |  |
| $M_{100}$ |  |  |  |
| MPa | 5.86 | 4.55 | 4.63 |
| psi | (850) | (660) | (670) |
| $T_b$ |  |  |  |
| Mpa | 15.6 | 11.3 | 11.5 |
| psi | (2260) | (1640) | (1670) |
| $E_b$ | 206 | 197 | 194 |
| H | 72 | 68 | 69 |
| CS | 21 | 26 | 24 |
| $T_g$ | −22 | −23 | −22 |

We claim:

1. In a perfluoroelastomer composition comprising copolymerized units of perfluoroolefin, perfluoro (alkyl vinyl) ether wherein the alkyl group contains 1–5 carbon atoms, and up to three mole percent of at least one curesite moiety, the improvement wherein the composition further comprises about from 5 to 20 phr of a perfluoropolyether having a viscosity of at least about 3000 mm$^2$/s, and wherein the perfluoropolyether consists essentially of oxygen atoms in the backbone of the molecule separated by saturated fluorocarbon groups.

2. A perfluoroelastomer composition of claim 1 wherein the perfluoropolyether has the general formula:

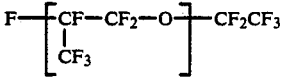

3. A perfluoroelastomer composition of claim 1 wherein the perfluoropolyether has a viscosity of about from 3000 to 4000 mm$^2$/s.

4. A perfluoroelastomer composition of claim 1 comprising about from 7 to 15 phr of the perfluoropolyether.

5. A perfluoroelastomer composition of claim 1 wherein the perfluoropolyether consists essentially of compound having the repeating unit

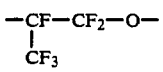

* * * * *